United States Patent
Kuriyama et al.

(10) Patent No.: US 11,870,517 B2
(45) Date of Patent: Jan. 9, 2024

(54) WIRELESS COMMUNICATION SYSTEM, WIRELESS COMMUNICATION METHOD, TRANSMITTING STATION DEVICE AND RECEIVING STATION DEVICE

(71) Applicant: NIPPON TELEGRAPH AND TELEPHONE CORPORATION, Tokyo (JP)

(72) Inventors: Keita Kuriyama, Musashino (JP); Hayato Fukuzono, Musashino (JP); Masafumi Yoshioka, Musashino (JP); Tsutomu Tatsuta, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 163 days.

(21) Appl. No.: 17/602,192

(22) PCT Filed: Mar. 26, 2020

(86) PCT No.: PCT/JP2020/013836
§ 371 (c)(1),
(2) Date: Oct. 7, 2021

(87) PCT Pub. No.: WO2020/209092
PCT Pub. Date: Oct. 15, 2020

(65) Prior Publication Data
US 2022/0216900 A1   Jul. 7, 2022

(30) Foreign Application Priority Data

Apr. 11, 2019   (JP) .................................. 2019-075560

(51) Int. Cl.
*H04B 7/0456*   (2017.01)
*H04B 7/005*   (2006.01)
*H04B 7/06*   (2006.01)
*H04B 7/08*   (2006.01)

(52) U.S. Cl.
CPC .......... *H04B 7/0456* (2013.01); *H04B 7/005* (2013.01); *H04B 7/06* (2013.01); *H04B 7/08* (2013.01)

(58) Field of Classification Search
CPC ........ H04B 7/0456; H04B 7/005; H04B 7/06; H04B 7/08
See application file for complete search history.

(56) References Cited

U.S. PATENT DOCUMENTS

2013/0177064 A1 *   7/2013   Ido ................... H03M 13/4107
375/232

FOREIGN PATENT DOCUMENTS

| JP | 2005-50058 A | 2/2005 |
| JP | 2007-214994 A | 8/2007 |

(Continued)

OTHER PUBLICATIONS

Kuriyama Keita, Fukuzono Hayato, Yoshioka Masafumi, Tatsuta Tsutomu, "FIR-type Transmit Beamforming for Wide-band Single Carrier MIMO Transmission", IEICE technical report, vol. 118, No. 435, RCS2018-247, pp. 31-36, Jan. 2019.

(Continued)

*Primary Examiner* — Curtis B Odom
(74) *Attorney, Agent, or Firm* — Harness, Dickey & Pierce, P.L.C.

(57) ABSTRACT

According to the present invention, in a wireless communication system that performs single carrier MIMO transmission between a transmitting station device and a receiving station device, the transmitting station device includes a time-domain linear equalization unit, a propagation path characteristics estimation unit configured to receive a training signal and estimate a transfer function matrix of propagation path characteristics, a filter tap calculation unit configured to calculate filter tap coefficients for the time-domain (Continued)

linear equalization unit based on the transfer function matrix by a predefined approach, and a transmission mode determination unit configured to make the filter tap calculation unit calculate the filter tap coefficients when the transfer function matrix meets a predefined condition, and to change a transmission mode and determine the transmission mode that meets the predefined condition when the transfer function matrix does not meet the predefined condition. The receiving station device includes a training signal generation unit configured to generate the training signal for use in estimation of propagation path characteristics and transmit the training signal to the transmitting station device.

5 Claims, 6 Drawing Sheets

(56) References Cited

FOREIGN PATENT DOCUMENTS

| | | |
|---|---|---|
| JP | 2017-069688 A | 4/2017 |
| JP | 2017-79392 A | 4/2017 |

OTHER PUBLICATIONS

International Search Report issued in PCT/JP2020/013836, dated Jun. 23, 2020; ISA/JP.

* cited by examiner

WIRELESS COMMUNICATION SYSTEM, WIRELESS COMMUNICATION METHOD, TRANSMITTING STATION DEVICE AND RECEIVING STATION DEVICE

CROSS-REFERENCE TO RELATED APPLICATIONS

This application is a 371 U.S. National Phase of International Application No. PCT/JP2020/013836 filed on Mar. 26, 2020, which claims priority to Japanese Application No. 2019-075560 filed on Apr. 11, 2019. The entire disclosures of the above applications are incorporated herein by reference.

TECHNICAL FIELD

The present invention relates to techniques for performing transmit beam forming with a time-domain linear equalizer in a wireless communication system that performs wide-band single carrier MIMO (SC-MIMO (Single Carrier Multiple-Input Multiple-Output)) transmission in a communication environment with frequency selective fading.

BACKGROUND ART

When wide-band SC-MIMO transmission is performed in a communication environment with frequency selective fading, it is necessary to remove inter-symbol interference caused by temporal spread of communication path characteristics and inter-stream interference caused by spatial spread of multiple antennas. To that end, there has been study on an approach to removing inter-symbol interference and inter-stream interference simultaneously by performing transmit beam forming in time/space directions using a time-domain linear equalizer of FIR (finite impulse response) type (an FIR filter) (see Non-Patent Literature 1, for instance). In transmit beam forming with an FIR filter, a time-domain linear equalizer is constructed using an inverse matrix of a transfer function matrix of propagation path characteristics (CIR (channel impulse response)) resulting from channel estimation as a transmit weight matrix and respective elements of the transmit weight matrix as filter tap coefficients.

CITATION LIST

Non-Patent Literature

Non-Patent Literature 1: Kuriyama Keita, Fukuzono Hayato, Yoshioka Masafumi, Tatsuta Tsutomu, "FIR-type Transmit Beamforming for Wide-band Single Carrier MIMO Transmission", IEICE technical report, vol. 118, no. 435, RCS2018-247, pp. 31-36, January 2019.

SUMMARY OF THE INVENTION

Technical Problem

Here, in the conventional technique above, an inverse matrix $H^{-1}(z)$ of a transfer function matrix $H(z)$ is computed as a transmit weight matrix $W(z)$ as shown in Expression (1).

[Math. 1]

$$W(z) = H^{-1}(z) \qquad (1)$$
$$= \frac{1}{\det(H(z))} adj(H(z))$$

In Expression (1), the transmit weight matrix $W(z)$ can be expressed by the product of transfer functions of $1/\det(H(z))$ and a matrix of $adj(H(z))$. Note that $\det(\bullet)$ and $adj(\bullet)$ represent a determinant and an adjugate matrix, respectively. The adj is different from an adjoint matrix representing Hermitian transposition.

An approach that uses the inverse matrix of the transfer function matrix $H(z)$ for CIR as the transfer functions for a linear equalizer has a problem of the transmit weight matrix $W(z)$ diverging when the determinant $\det(H(z))$ of the transfer function matrix is in a non-minimum phase, making it impossible to remove inter-symbol interference and inter-stream interference with a time-domain linear equalizer.

FIG. 6 shows an example of filter tap coefficients when det(Hz) is in the minimum phase versus in a non-minimum phase. In FIG. 6, the horizontal axis indicates time corresponding to delay taps ($Z^{-0}, Z^{-1}, Z^{-2}$ . . . ) of an FIR filter, and the vertical axis indicates complex gain corresponding to the filter tap coefficient for each delay tap. FIG. 6(a) shows complex gain for each delay tap when $\det(H(z))$ is in the minimum phase, while FIG. 6(b) shows complex gain for each delay tap when $\det(H(z))$ is in a non-minimum phase.

In FIG. 6(a), when $\det(H(z))$ is in the minimum phase, the complex gain of the delay tap gradually decreases to converge, so that operation is stable and implementation of an equalizer with an FIR filter is possible. By contrast, in FIG. 6(b), when $\det(H(z))$ is in a non-minimum phase, the complex gain of the delay tap gradually increases to diverge, so that the operation becomes unstable and implementation with a time-domain linear equalizer such as an FIR filter is difficult.

The present invention is aimed at providing a wireless communication system, a wireless communication method, a transmitting station device and a receiving station device that can remove inter-symbol interference and inter-stream interference using a time-domain linear equalizer by changing antenna combination so that the determinant of the transfer function matrix $H(z)$ for CIR will not be in a non-minimum phase in SC-MIMO transmission.

Means for Solving the Problem

A first aspect of the present invention is a wireless communication system that performs single carrier MIMO transmission between a transmitting station device and a receiving station device, the transmitting station device including: a time-domain linear equalization unit configured to remove inter-symbol interference and inter-stream interference from a data signal to be transmitted to the receiving station device; a propagation path characteristics estimation unit configured to receive a training signal which is transmitted by the receiving station device and estimate a transfer function matrix of propagation path characteristics; a filter tap calculation unit configured to calculate filter tap coefficients for the time-domain linear equalization unit based on the transfer function matrix by a predefined approach; and a transmission mode determination unit configured to make the filter tap calculation unit calculate the filter tap coefficients when the transfer function matrix meets a predefined condition, and to change a transmission mode and determine the transmission mode that meets the predefined condition when the transfer function matrix does not meet the predefined condition, and the receiving station device including a training signal generation unit configured to generate the training signal for use in estimation of propagation path characteristics and transmit the training signal to the transmitting station device.

A second aspect of the present invention is a wireless communication system that performs single carrier MIMO transmission between a transmitting station device and a receiving station device, the transmitting station device including: a time-domain linear equalization unit configured to remove inter-symbol interference and inter-stream interference from a data signal to be transmitted to the receiving station device; a training signal generation unit configured to generate a training signal for use in estimation of propagation path characteristics and transmit the training signal to the receiving station device, and the receiving station device including: a propagation path characteristics estimation unit configured to receive the training signal which is transmitted by the transmitting station device and estimate a transfer function matrix of propagation path characteristics; a filter tap calculation unit configured to calculate filter tap coefficients for the time-domain linear equalization unit of the transmitting station device based on the transfer function matrix by a predefined approach; and a transmission mode determination unit configured to make the filter tap calculation unit calculate the filter tap coefficients when the transfer function matrix meets a predefined condition, and to change a transmission mode and determine the transmission mode that meets the predefined condition when the transfer function matrix does not meet the predefined condition.

A third aspect of the present invention is the first aspect or the second aspect of the invention, in which the predefined approach is an approach that determines a transmit weight matrix $W(z)$ with a product of $1/det(H(z))$ and $adj(H(z))$ using a determinant $det(H(z))$ of a transfer function matrix $H(z)$ for CIR and an adjugate matrix $adj(H(z))$; the predefined condition is whether the determinant $det(H(z))$ of the transfer function matrix $H(z)$ is in a minimum phase or not; and changing of the transmission mode is changing of antenna combination including a multiplex factor of antennas of the transmitting station device and the receiving station device.

A fourth aspect of the present invention is a wireless communication method in a wireless communication system that performs single carrier MIMO transmission between a transmitting station device and a receiving station device, the transmitting station device performing: time-domain linear equalization processing for removing inter-symbol interference and inter-stream interference from a data signal to be transmitted to the receiving station device; propagation path characteristics estimation processing for receiving a training signal which is transmitted by the receiving station device and estimating a transfer function matrix of propagation path characteristics; filter tap calculation processing for calculating filter tap coefficients for the time-domain linear equalization processing based on the transfer function matrix by a predefined approach; and transmission mode determination processing for calculating the filter tap coefficients by the filter tap calculation processing when the transfer function matrix meets a predefined condition, and for changing a transmission mode and determining the transmission mode that meets the predefined condition when the transfer function matrix does not meet the predefined condition, and the receiving station device performing training signal generation processing for generating the training signal for use in estimation of propagation path characteristics and transmitting the training signal to the transmitting station device.

A fifth aspect of the present invention is a wireless communication method in a wireless communication system that performs single carrier MIMO transmission between a transmitting station device and a receiving station device, the transmitting station device performing: time-domain linear equalization processing for removing inter-symbol interference and inter-stream interference from a data signal to be transmitted to the receiving station device; and training signal generation processing for generating a training signal for use in estimation of propagation path characteristics and transmitting the training signal to the receiving station device, and the receiving station device performing: propagation path characteristics estimation processing for receiving the training signal which is transmitted by the transmitting station device and estimating a transfer function matrix of propagation path characteristics; filter tap calculation processing for calculating filter tap coefficients for the time-domain linear equalization processing at the transmitting station device based on the transfer function matrix by a predefined approach; and transmission mode determination processing for calculating the filter tap coefficients by the filter tap calculation processing when the transfer function matrix meets a predefined condition, and for changing a transmission mode and determining the transmission mode that meets the predefined condition when the transfer function matrix does not meet the predefined condition.

A sixth aspect of the present invention is the fourth aspect or the fifth aspect of the invention, in which the predefined approach is an approach that determines a transmit weight matrix $W(z)$ with a product of $1/det(H(z))$ and $adj(H(z))$ using a determinant $det(H(z))$ of a transfer function matrix $H(z)$ for CIR and an adjugate matrix $adj(H(z))$; the predefined condition is whether the determinant $det(H(z))$ of the transfer function matrix $H(z)$ is in a minimum phase or not, and changing of the transmission mode is changing of antenna combination including a multiplex factor of antennas of the transmitting station device and the receiving station device.

A seventh aspect of the present invention is a transmitting station device that performs single carrier MIMO transmission with a receiving station device, the transmitting station device including: a time-domain linear equalization unit configured to remove inter-symbol interference and inter-stream interference from a data signal to be transmitted to the receiving station device; a propagation path characteristics estimation unit configured to receive a training signal which is transmitted from the receiving station device for use in estimation of propagation path characteristics and to estimate a transfer function matrix of propagation path characteristics; a filter tap calculation unit configured to calculate filter tap coefficients for the time-domain linear equalization unit based on the transfer function matrix by a predefined approach; and a transmission mode determination unit configured to make the filter tap calculation unit calculate the filter tap coefficients when the transfer function matrix meets a predefined condition, and to change a transmission mode and determine the transmission mode that meets the predefined condition when the transfer function matrix does not meet the predefined condition.

An eighth aspect of the present invention is a receiving station device that performs single carrier MIMO transmission with a transmitting station device, the receiving station device including: a propagation path characteristics estimation unit configured to receive a training signal which is transmitted by the transmitting station device for use in estimation of propagation path characteristics and to estimate a transfer function matrix of propagation path characteristics; a filter tap calculation unit configured to calculate filter tap coefficients for a time-domain linear equalization unit of the transmitting station device based on the transfer function matrix by a predefined approach; and a transmission mode determination unit configured to make the filter tap calculation unit calculate the filter tap coefficients when the transfer function matrix meets a predefined condition, and to change a transmission mode and determine the transmission mode that meets the predefined condition when the transfer function matrix does not meet the predefined condition.

Effects of the Invention

The wireless communication system, the wireless communication method, the transmitting station device and the receiving station device according to the present invention can remove inter-symbol interference and inter-stream interference using a time-domain linear equalizer by changing antenna combination so that the determinant of the transfer function matrix H(z) for CIR will not be in a non-minimum phase in SC-MIMO transmission.

DESCRIPTION OF EMBODIMENTS

Embodiments of the wireless communication system, wireless communication method, the transmitting station device and the receiving station device according to the present invention are described below with reference to drawings.

Figure 1:
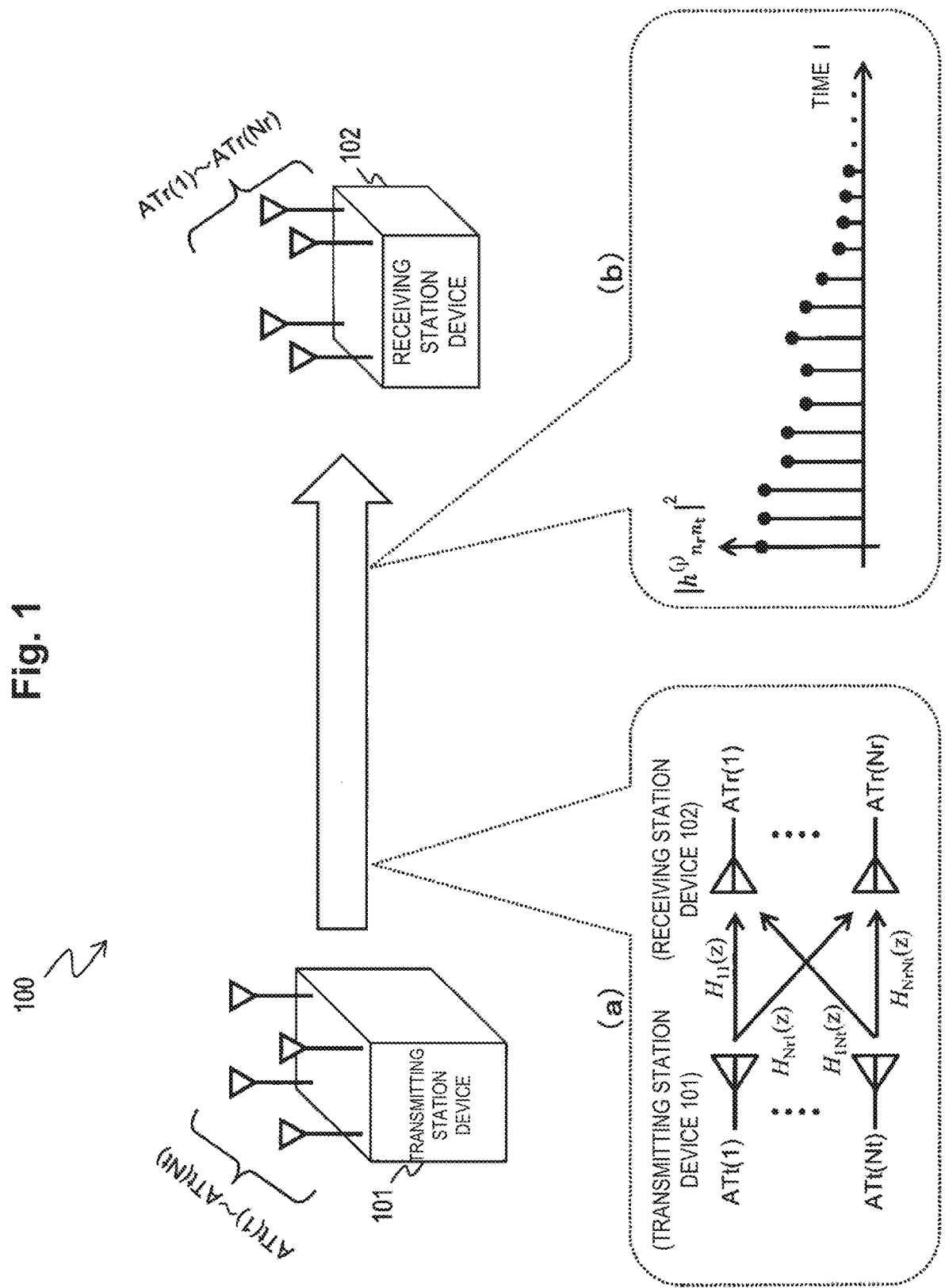
FIG. 1 shows an example of overall configuration of a wireless communication system in various embodiments.

FIG. 1 shows an example of overall configuration of a wireless communication system 100, which is common to various embodiments. In FIG. 1, the wireless communication system 100 includes a transmitting station device 101 and a receiving station device 102 and performs wireless communication between the transmitting station device 101 and the receiving station device 102. The transmitting station device 101 has multiple ($N_T$, an integer $N_T \geq 2$) antennas from an antenna ATt(1) through an antenna ATt($N_T$). The receiving station device 102 has multiple ($N_N$, an integer $N_R \geq 2$) antennas from an antenna ATr(1) through an antenna ATr($N_R$). In the following description, for discussion common to the antenna ATt(1) through the antenna ATt($N_T$) of the transmitting station device 101, they are indicated as antenna ATt omitting "(number)" at the end of their reference signs, and are indicated as antenna ATt(1), for example, with addition of "(number)" at the end of the reference sign when a specific antenna is referred to. The antenna ATr(1) through the antenna ATr($N_R$) of the receiving station device 102 are also indicated in a similar manner. Also, multiple same blocks, if provided, are indicated in a similar manner.

The wireless communication system 100 according to the present embodiment performs wireless communication of wide-band SC-MIMO scheme using multiple antennas between the transmitting station device 101 and the receiving station device 102. As shown in FIG. 1(a), inter-stream interference due to spatial spread occurs between the $N_T$ antennas of the transmitting station device 101 and the $N_R$ antennas of the receiving station device 102. Also, signals transmitted and received between the respective antennas of the transmitting station device 101 and the receiving station device 102 undergo frequency selective fading due to multiple delayed waves with different delay times such as multipath, giving rise to inter-symbol interference due to temporal spread such as shown in FIG. 1(b). Thus, inter-stream interference and inter-symbol interference need to be suppressed in the wireless communication system 100.

Here, the CIR of a wireless communication path between the transmitting station device 101 and the receiving station device 102 can be represented by a matrix of transfer functions (referred to as a transfer function matrix) H(z), which has $N_T \times N_R$ elements according to the number of multiple antennas. Expression (2) represents a transfer function matrix H(z) for N×N MIMO, where $N_R = N_T (=N)$. The transfer function matrix H(z) is an Nth-order polynomial matrix.

[Math. 2]

$$H(z) = \begin{bmatrix} H_{11}(z) & \cdots & H_{1N}(z) \\ \vdots & \ddots & \vdots \\ H_{N1}(z) & \cdots & H_{NN}(z) \end{bmatrix} \quad (2)$$

In Expression (2), a transfer function $H_{ij}(z)$ at each element of the transfer function matrix H(z) is represented by Expression (3). The transfer function $H_{ij}(z)$ is an Lth-order polynomial.

[Math. 4]

$$\begin{aligned} W(z) &= H^{-1}(z) \\ &= \frac{1}{\det(H(z))} adj(H(z)) \end{aligned} \quad (4)$$

Here, i is an integer $1 \leq i \leq N$, and j is an integer $1 \leq j \leq N$. Also, $h^{(l)}_{ij}$ indicates the CIR for the l-th path between the i-th receive antenna and the j-th transmit antenna. L is CIR length (equivalent to the number of paths a signal propagates through), and $z^{-l}$ is a delay operator for the transfer function.

Then, by constructing a linear equalization unit with an inverse matrix $H^{-1}(z)$ of the transfer function matrix H(z) as the transmit weight matrix W(z), inter-symbol interference and inter-stream interference can be removed simultaneously.

Expression (4) shows the transmit weight matrix W(z). Note that Expression (4) is the same as the Expression (1) described in the prior art, and the transmit weight matrix W(z) can be represented by the adjugate matrix det(H(z)) and the determinant adj(H(z)).

[Math. 3]

$$H_{ij}(z) = \sum_{l=0}^{L-1} h_{ij}^{(l)} z^{-l} \quad (3)$$

As shown in Expression (4), the transmit weight matrix W(z) can be represented by the product of the transfer functions of 1/det(H(z)) and the matrix of adj(H(z)).

Here, an approach that uses the inverse matrix of the transfer function matrix H(z) for CIR as the transfer functions for a linear equalizer has a problem of the transmit weight matrix W(z) diverging when the determinant det(H(z)) of the transfer function matrix is in a non-minimum phase, making it impossible to remove inter-symbol interference and inter-stream interference with a time-domain linear equalizer.

For example, in the case of 2×2 MIMO, the determinant det(H(z)) of the transfer function matrix H(z) is represented by Expression (5).

[Math. 5]

$$\det(H(z)) = H_{11}(z)H_{22}(z) - H_{12}(z)H_{21}(z) \quad (5)$$

Here, applicability of the transmit weight matrix W(z) of Expression (4) will vary depending on a condition of whether the determinant det(H(z)) of the transfer function matrix is in a non-minimum phase or in the minimum phase in Expression (5).

Accordingly, in the wireless communication system according to each embodiment described below, when the determinant det(H(z)) of the transfer function matrix H(z) is in a non-minimum phase, a condition is found under which the determinant det(H(z)) will be in the minimum phase by changing the combination of antennas ATt of the transmitting station device 101 and antennas ATr of the receiving station device 102, and control is effected so that the transmit weight matrix W(z) does not diverge. How to change the antennas combination is described in detail later.

Figure 2:
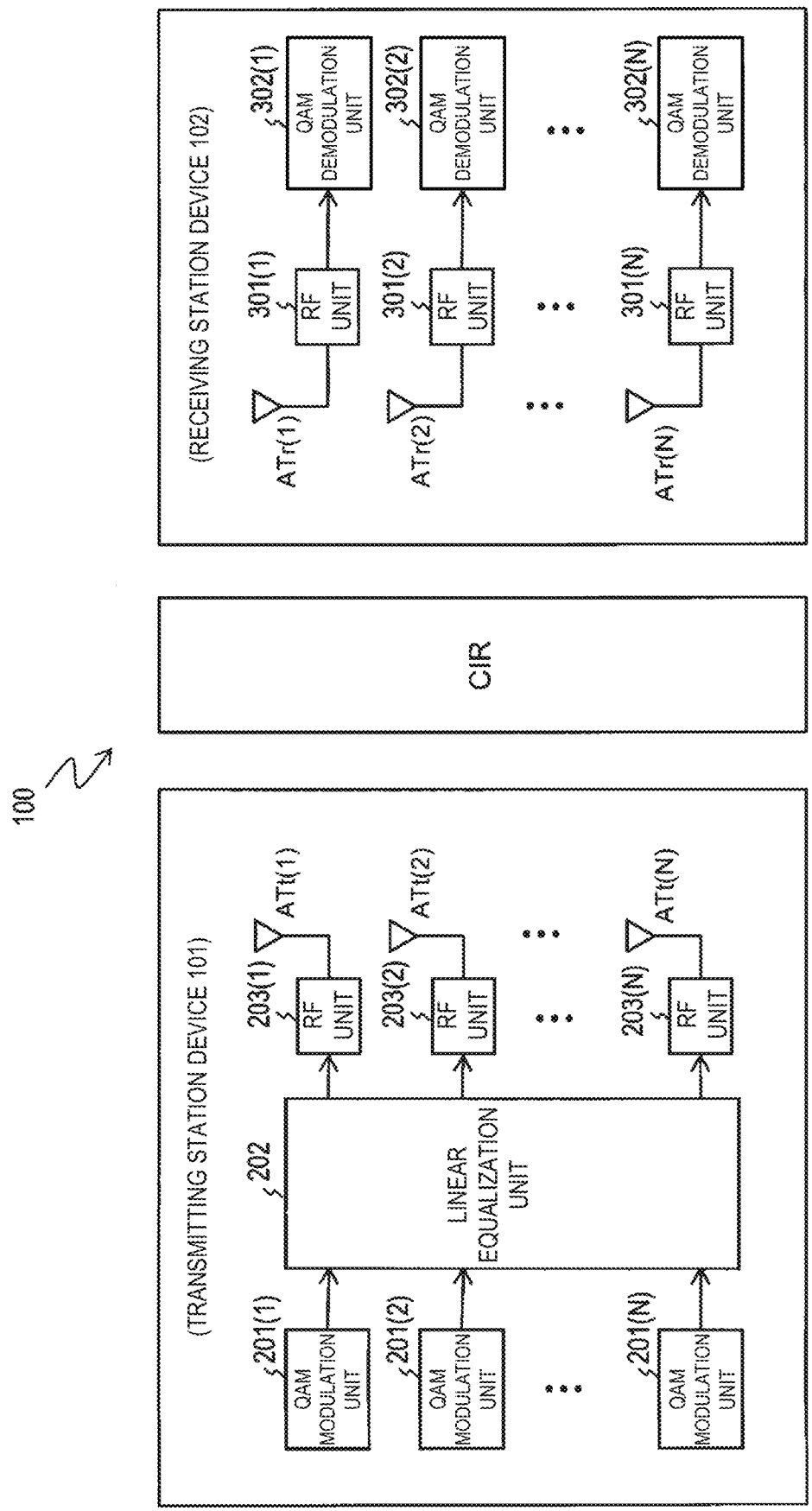
FIG. 2 shows an example of a transmitting station device and a receiving station device.

FIG. 2 shows an example of the transmitting station device 101 and the receiving station device 102. In FIG. 2, the transmitting station device 101 includes a QAM modulation unit 201, a linear equalization unit 202, an RF unit 203, and antennas ATt.

The QAM modulation unit 201 outputs a data signal S(n), generated by quadrature amplitude modulation (QAM) of a bit string of data information bits which are to be transmitted to the receiving station device 102. The QAM modulation unit 201 has a QAM modulation unit 201(1) through a QAM modulation unit 201(N) and outputs data signals corresponding to N streams.

The linear equalization unit 202 performs equalization processing for inter-symbol interference and inter-stream interference with the transmit weight matrix W(z) computed based on the CIR between the transmitting station device 101 and the receiving station device 102. How to compute the transmit weight matrix W(z) is described in detail later. At the same time with the equalization processing, processing for normalizing transmission power is also performed.

The RF unit 203 has N RF units: an RF unit 203(1) through an RF unit 203(N) corresponding to the N antennas ATt respectively, and frequency-converts a signal outputted by the linear equalization unit 202 into a transmit signal of a high frequency and sends it from each antenna ATt for each stream.

The antennas ATt include N antennas: the antenna ATt(1) through antenna the ATt(N), and radiates the high-frequency signal for each stream outputted by the RF unit 203 into space as an electromagnetic wave.

In this manner, the transmitting station device 101 can transmit signals from which inter-symbol interference and inter-stream interference have been removed by the linear equalization unit 202 to the receiving station device 102.

In FIG. 2, the receiving station device 102 includes the antennas ATr, an RF unit 301 and a QAM demodulation unit 302.

The antennas ATr include N antennas for transmission and reception: the antenna ATr(1) through the antenna ATr(N), and converts an electromagnetic wave in space transmitted from the transmitting station device 101 into a high-frequency signal.

The RF unit 301 has N RF units: an RF unit 301(1) through an RF unit 301(N) respectively corresponding to the N antennas ATr, and frequency-converts the respective high-frequency signals outputted by the antenna ATr(1) through the antenna ATr(N) into baseband data signals.

The QAM demodulation unit 302 demodulates data signals S^(n) for N streams outputted by the RF unit 301 into information bits and outputs a bit string. Since the RF unit 301 outputs data signals S^(n) for N streams according to the number of antennas ATr, the QAM demodulation unit 302 demodulates the data signal S^(n) for each stream.

In this manner, the receiving station device 102 can receive signals from which inter-symbol interference and inter-stream interference have been removed on the transmitting station device 101 side and demodulate the data signals.

In FIG. 2, when representing the data signal outputted by the QAM modulation unit 201 as S(n), the transmit weight matrix of the linear equalization unit 202 as W(Z), the transfer function matrix for CIR as H(z), the data signal outputted by the RF unit 301 as S^(n), and additive noise as η(n), relationship of a signal transmitted/received in the wireless communication system 100 according to the present embodiment can be represented by Expression (6):

[Math. 6]

$$\hat{S}(n) = H(z)W(z)S(n) + \eta(n) \quad (6)$$

First Embodiment

Figure 3:
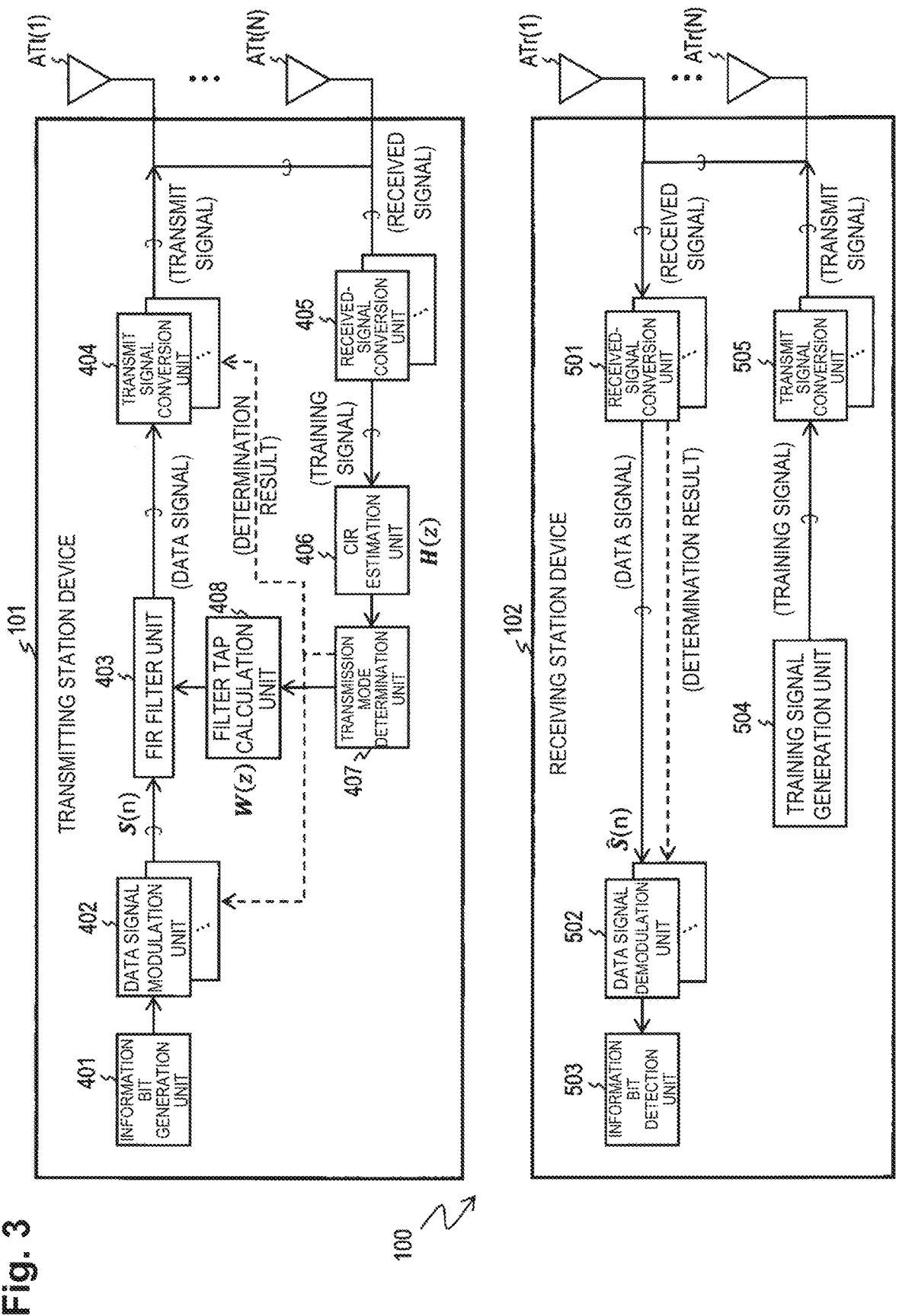
FIG. 3 shows an example of the transmitting station device and the receiving station device according to a first embodiment.

FIG. 3 shows an example of the transmitting station device 101 and the receiving station device 102 according to the first embodiment. In FIG. 3, the wireless communication system 100 includes the transmitting station device 101 and the receiving station device 102.

In FIG. 3, the transmitting station device 101 includes an information bit generation unit 401, a data signal modulation unit 402, an FIR filter unit 403, a transmit signal conversion unit 404, a received-signal conversion unit 405, an CIR estimation unit 406, a transmission mode determination unit 407, a filter tap calculation unit 408, and N antennas from the antenna ATt(1) through the antenna ATt(N). Also in FIG. 3, the receiving station device 102 includes N antennas from the antenna ATr(1) through the antenna ATr(N), a received-signal conversion unit 501, a data signal demodulation unit 502, an information bit detection unit 503, a training signal generation unit 504, and a transmit signal conversion unit 505.

First, the configuration of the transmitting station device 101 is described.

The information bit generation unit 401 generates data information bits for transmission to the receiving station device 102. The data information bits are a bit string corresponding to a data signal inputted from outside (not shown), a data signal internally generated and the like, for example. The information bit generation unit 401 changes the number of signal streams in accordance with the number of antennas ATt which are used in transmission determined by the transmission mode determination unit 407 discussed later, and outputs each signal stream to the data signal modulation unit 402. The information bit generation unit 401 may also have an error correction coding feature for generating an error correction code with a predetermined coding rate, an interleaving feature and the like.

The data signal modulation unit 402 outputs a data signal S(n) generated by modulating a bit string for each signal stream outputted by the information bit generation unit 401 by a predetermined modulation scheme (e.g., quadrature amplitude modulation (QAM)). Since in the present embodiment the information bit generation unit 401 outputs data signals which have been modulated for each of signal streams divided according to the number of antennas ATt, the data signal modulation unit 402 is provided for each one stream.

The FIR filter unit 403 outputs to the transmit signal conversion unit 404 a signal generated by removing inter-symbol interference and inter-stream interference from the data signal S(n) outputted by the data signal modulation unit 402 using a filter tap coefficient computed by the filter tap calculation unit 408 discussed later. Here, the FIR filter unit 403 corresponds to a linear equalization unit which performs time-domain linear equalization processing. The FIR filter unit 403 has, for example, delay taps for holding a data signal outputted by the data signal modulation unit 402 and shifting it at certain intervals, and outputs a sum of signals obtained by multiplying the signals from the respective delay taps by a predetermined filter tap coefficient. In this manner, the FIR filter unit 403 performs time-domain linear equalization processing for removing inter-symbol interference and inter-stream interference. The FIR filter unit 403 also performs processing for normalizing transmission power at the same time with the time-domain linear equalization processing.

The transmit signal conversion unit 404 frequency-converts a data signal outputted by the FIR filter unit 403 into a transmit signal of a high frequency for transmission from the antenna ATt. For example, the transmit signal conversion unit 404 up-converts a data signal in 20 MHz band into a high-frequency signal in 5 GHz band and sends it from the antenna ATt. Here, respective ones of multiple divided signal streams are converted into high-frequency signals and sent from the antennas ATt of a combination to be used for transmission determined by the transmission mode determination unit 407 discussed later.

The antennas ATt include N antennas for transmission and reception from the antenna ATt(1) through the antenna ATt(N), and radiates the high-frequency signal outputted by the transmit signal conversion unit 404 into space as an electromagnetic wave. Alternatively, the antennas ATt convert an electromagnetic wave in space transmitted from the receiving station device 102 into high-frequency signals and output them to the received-signal conversion unit 405. For example, a combination of M (M being a positive integer, M<N) antennas ATt out of the N antennas ATt is selected by the transmission mode determination unit 407 discussed later and M signal streams are transmitted from the selected M antennas ATt, respectively.

The received-signal conversion unit 405 converts frequency-converts the high-frequency received signals received by the respective ones of the antenna ATt(1) through the antenna ATt(N) into a baseband signal of a low frequency. For example, the received-signal conversion unit 405 down-converts a high-frequency signal in 5 GHz band and outputs a baseband signal in 20 MHz band. Here, in the present embodiment, the received-signal conversion unit 405 receives a training signal from the receiving station device 102 and outputs it to the CIR estimation unit 406.

The CIR estimation unit 406 estimates the CIR based on the training signal transmitted from the receiving station device 102. The CIR estimation unit 406 corresponds to a propagation path characteristics estimation unit for executing propagation path characteristics estimation processing.

The transmission mode determination unit 407 assesses a predefined condition, and if the condition is not met, changes the transmission mode (e.g., antenna combination) and iteratively performs similar processing until an antenna combination including a multiplex factor of antennas satisfying the condition (hereinafter referred to as antenna combination unless otherwise required) is found (corresponding to transmission mode determination processing). For the antenna combination, when selecting nine antennas out of ten antennas for example, there are ten possible combinations, hence 100 possible combinations across the transmitting station device 101 and the receiving station device 102, and an antenna combination meeting the determination condition is found from those combinations. If none is found, similar processing is repeated with a reduced number of antennas for selection (multiplex factor). Here, in the present embodiment, the determination condition is whether $\det(H(z))$ is in the minimum phase or in a non-minimum phase when the transmit weight matrix $W(z)$ is represented by the product of the transfer functions of $1/\det(H(z))$ and the matrix of $\mathrm{adj}(H(z))$ as described in Expression (4). Then, if $\det(H(z))$ is in a non-minimum phase, the antenna combination is changed and an antenna combination with which $\det(H(z))$ is in the minimum phase is determined. Changing of the antenna combination can be effected by selecting the transmit signal conversion units 404 corresponding to the antennas ATt to be used, for example. Specifically, when the antenna ATt(1) through an antenna ATt(M) are used, a transmit signal conversion unit 404(1) through a transmit signal conversion unit 404(M) may be selected. Here, a norm for determining the transmission mode is not limited to the determinant $\det(H(z))$; any application condition appropriate for the way of computing the transmit weight matrix $W(z)$ may be used. For example, in a case of transforming the transmit weight matrix $W(z)$ into an expression for the time-domain linear equalizer according to a different condition rather than representing it as the product of the transfer functions of $1/\det(H(z))$ and the matrix of $\mathrm{adj}(H(z))$ as in Expression (4), determination may be made by that condition. The transmission mode determination unit 407 notifies the receiving station device 102 of a determination result via the transmit signal conversion unit 404 and the antennas ATt, enabling the antenna combination to be changed on the receiving station device 102 side as well. Notification of the determination result to the receiving station device 102 can use a method that prepares indices recording antenna combinations in the transmitting station device 101 and the receiving station device 102 in advance and gives a notification of an index number before starting data transmission, for example.

The filter tap calculation unit 408 computes the transmit weight matrix $W(z)$ for the transmission mode determined by the transmission mode determination unit 407 based on the CIR estimated by the CIR estimation unit 406. The filter tap calculation unit 408 also calculates filter tap coefficients for use in the FIR filter unit 403 based on the respective elements of the transmit weight matrix W(z) and outputs them to the FIR filter unit 403 (corresponding to filter tap calculation processing).

In this manner, the transmitting station device 101 can transmit data signals from which inter-symbol interference and inter-stream interference have been removed by the FIR filter unit 403 to the receiving station device 102.

Next, the configuration of the receiving station device 102 shown in FIG. 3 is described.

The antennas ATr include N antennas for transmission and reception: the antenna ATr(1) through the antenna ATr(N), and radiate a high-frequency signal outputted by the transmit signal conversion unit 505 discussed later into space as an electromagnetic wave. Alternatively, the antennas ATr convert an electromagnetic wave in space transmitted from the transmitting station device 101 into high-frequency signals and outputs them to the received-signal conversion unit 501 discussed later. In the present embodiment, a combination of M (M<N) antennas ATr out of the N antennas ATr is selected based on an antenna combination indicated from the transmitting station device 101, and signals are received by the selected M antennas ATr. Changing of the antenna combination can be effected by selecting the received-signal conversion units 501 corresponding to the antennas ATr to be used, for example. Specifically, when the antenna ATr(1) through an antenna ATr(M) are used, received signals of the received-signal conversion unit 501(1) through a received-signal conversion unit 501(M) may be selected.

The received-signal conversion unit 501 frequency-converts the high-frequency signals received from the respective ones of the antenna ATr(1) through the antenna ATr(N) into a baseband signal, as with the received-signal conversion unit 405 of the transmitting station device 101. Here, data signals received from the transmitting station device 101 are outputted to the data signal demodulation unit 502.

The data signal demodulation unit 502 demodulates the data signal $\hat{S}(n)$ outputted by the received-signal conversion unit 501 into information bits and outputs a bit string. Since the received-signal conversion unit 501 outputs the data signal $\hat{S}(n)$ for multiple streams according to the number of antennas ATr, the data signal demodulation unit 502 demodulates the data signal $\hat{S}(n)$ for each stream. Then, the data signal demodulation unit 502 outputs a bit string formed by concatenating bit strings that have been divided into multiple streams on the transmitting station device 101 side to the information bit detection unit 503. The data signal demodulation unit 502 may have an error correction decoding feature and/or a deinterleaving feature as appropriate for the functionality of the transmitting station device 101 side. Here, for example, the received-signal conversion units 501 corresponding to the antennas ATr to be used are selected based on the antenna combination, and data signals are demodulated by the data signal demodulation units 502 corresponding to the selected received-signal conversion units 501. Specifically, when the antenna ATr(1) through the antenna ATr(M) are used, data signals are demodulated by the data signal demodulation unit 502(1) through the data signal demodulation unit 502(M) corresponding to the received-signal conversion unit 501(1) through the received-signal conversion unit 501(M).

The information bit detection unit 503 outputs received data generated by converting the bit string outputted by the data signal demodulation unit 502 into digital data. An error correction decoding feature and/or a deinterleaving feature may be implemented on the information bit detection unit 503 side.

The training signal generation unit 504 generates a training signal for the CIR estimation unit 406 of the transmitting station device 101 to estimate the CIR (corresponding to training signal generation processing). The training signal is a predetermined signal generated by modulating a pre-defined information, such as a preamble for signal detection (e.g., a specific pattern such as an alternating pattern of "01"), with a modulation scheme resistant to interference such as PSK (Phase Shift Keying), and is used for estimating the CIR on the transmitting station device 101 side. Information on the training signal which is transmitted by the receiving station device 102 is known by the transmitting station device 101 in advance.

The transmit signal conversion unit 505 converts the training signal outputted by the training signal generation unit 504 into a high-frequency signal and sends it from the antennas ATr.

In this manner, the receiving station device 102 can transmit the training signal for estimating the CIR on the transmitting station device 101 side and receive data signal transmitted from the transmitting station device 101 in which inter-symbol interference and inter-stream interference have been equalized.

Second Embodiment

Figure 4:
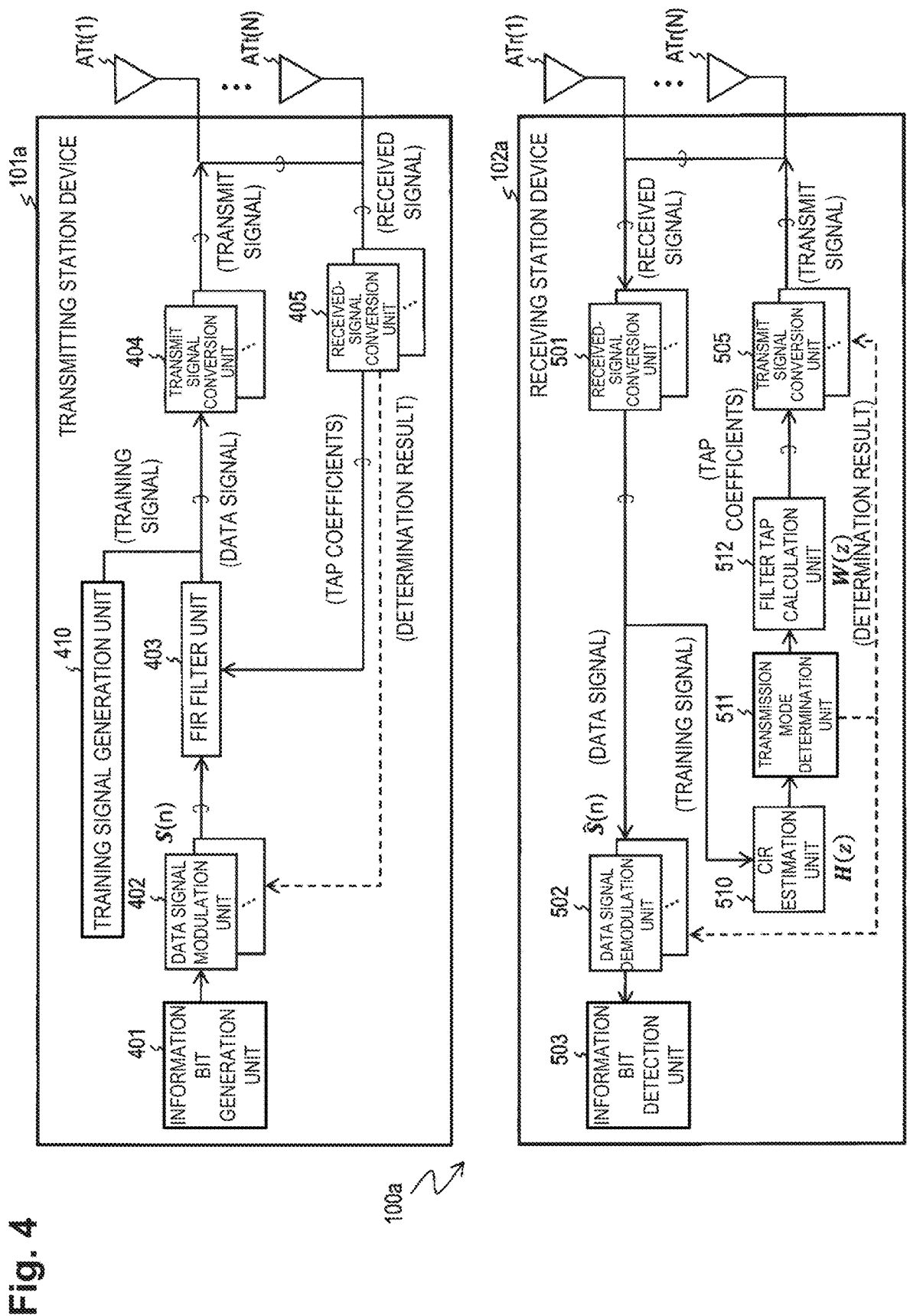
FIG. 4 shows an example of the transmitting station device and the receiving station device according to a second embodiment.

FIG. 4 shows an example of a transmitting station device 101a and a receiving station device 102a according to a second embodiment. In FIG. 4, a wireless communication system 100a includes the transmitting station device 101a and the receiving station device 102a.

In FIG. 4, the transmitting station device 101a includes an information bit generation unit 401, a data signal modulation unit 402, an FIR filter unit 403, a transmit signal conversion unit 404, a received-signal conversion unit 405, a training signal generation unit 410, and N antennas from an antenna ATt(1) through an antenna ATt(N). Also in FIG. 4, the receiving station device 102a includes N antennas from an antenna ATr(1) through an antenna ATr(N), a received-signal conversion unit 501, a data signal demodulation unit 502, an information bit detection unit 503, a transmit signal conversion unit 505, an CIR estimation unit 510, a transmission mode determination unit 511 and a filter tap calculation unit 512.

Here, the wireless communication system 100a shown in FIG. 4 is different from the wireless communication system 100 described in FIG. 3 in the following two respects. A first difference is that the training signal is transmitted from the transmitting station device 101a. A second difference is that the receiving station device 102a performs CIR estimation, determination of the transmission mode and calculation of filter tap coefficients and transmits the calculated filter tap coefficients to the FIR filter unit 403 of the transmitting station device 101a. In FIG. 4, primary operations of the blocks with the same reference signs as in FIG. 3 are the same as in FIG. 3.

Differences from FIG. 3 are described below.

First, the configuration of the transmitting station device 101a is described.

The training signal generation unit 410 operates in a similar manner to the training signal generation unit 504 in the first embodiment and generates a training signal for the CIR estimation unit 510 of the receiving station device 102a to estimate the CIR (corresponding to training signal generation processing). Information on the training signal which is transmitted by the transmitting station device 101a is known by the receiving station device 102a in advance.

The FIR filter unit 403 outputs to the transmit signal conversion unit 404 signals generated by removing inter-symbol interference and inter-stream interference from the data signal S(n) outputted by the data signal modulation unit 402 using the filter tap coefficients received from the receiving station device 102a (corresponding to FIR filter processing). A difference of the FIR filter unit 403 in the second embodiment from the FIR filter unit 403 in the first embodiment is use of the filter tap coefficients received from the receiving station device 102a via the received-signal conversion unit 405 and antennas ATt, and its chief operation is the same as in the first embodiment.

Next, the configuration of the receiving station device 102a is described.

The CIR estimation unit 510 operates in a similar manner to the CIR estimation unit 406 in the first embodiment and estimates the CIR based on the training signal transmitted from the transmitting station device 101a. The CIR estimation unit 510 corresponds to a propagation path characteristics estimation unit for executing propagation path characteristics estimation processing.

The transmission mode determination unit 511 operates in a similar manner to the transmission mode determination unit 407 in the first embodiment, and determines an antenna combination with which det(H(z)) is in the minimum phase by changing the antenna combination. The transmission mode determination unit 511 notifies the transmitting station device 101a of a determination result via the transmit signal conversion unit 505 and the antennas ATr, enabling the antenna combination to be changed on the transmitting station device 101a side as well. Notification of the determination result to the transmitting station device 101a can use a method that prepares indices recording antenna combinations and gives a notification of an index number before starting data transmission, as described in the first embodiment.

The filter tap calculation unit 512 operates in a similar manner to the filter tap calculation unit 408 in the first embodiment and computes the transmit weight matrix W(z) for the transmission mode determined by the transmission mode determination unit 407 based on the CIR estimated by the CIR estimation unit 510, and calculates filter tap coefficients for use in the FIR filter unit 403 of the transmitting station device 101a based on the respective elements of the transmit weight matrix W(z) (corresponding to filter tap calculation processing). In the present embodiment, the filter tap calculation unit 512 is transmitted to the transmitting station device 101a via the transmit signal conversion unit 505 and the antennas ATr and set in the FIR filter unit 403 of the transmitting station device 101a.

In this manner, the wireless communication system 100a according to the present embodiment can transmit data signals free from inter-symbol interference and inter-stream interference to the receiving station device 102a by performing CIR estimation, determination of the transmission mode and calculation of filter tap coefficients on the receiving station device 102a side by means of the training signal transmitted by the transmitting station device 101a, and transmitting and setting the calculated filter tap coefficients to the FIR filter unit 403 of the transmitting station device 101a.

[Processing Method in the First Embodiment and the Second Embodiment]

Figure 5:
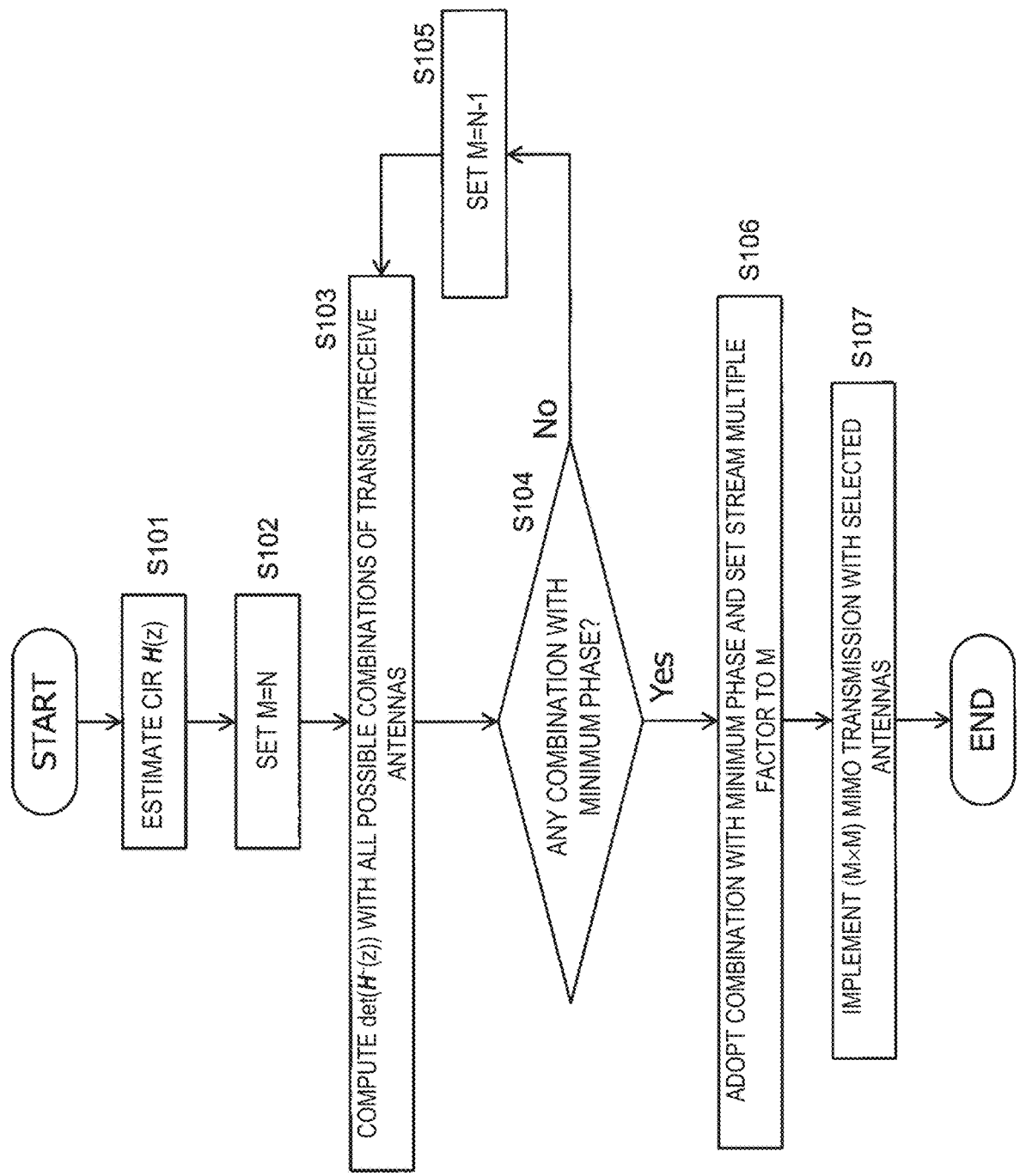
FIG. 5 shows an example of processing performed by the wireless communication system according to the first embodiment or the wireless communication system according to the second embodiment.
Figure 6:
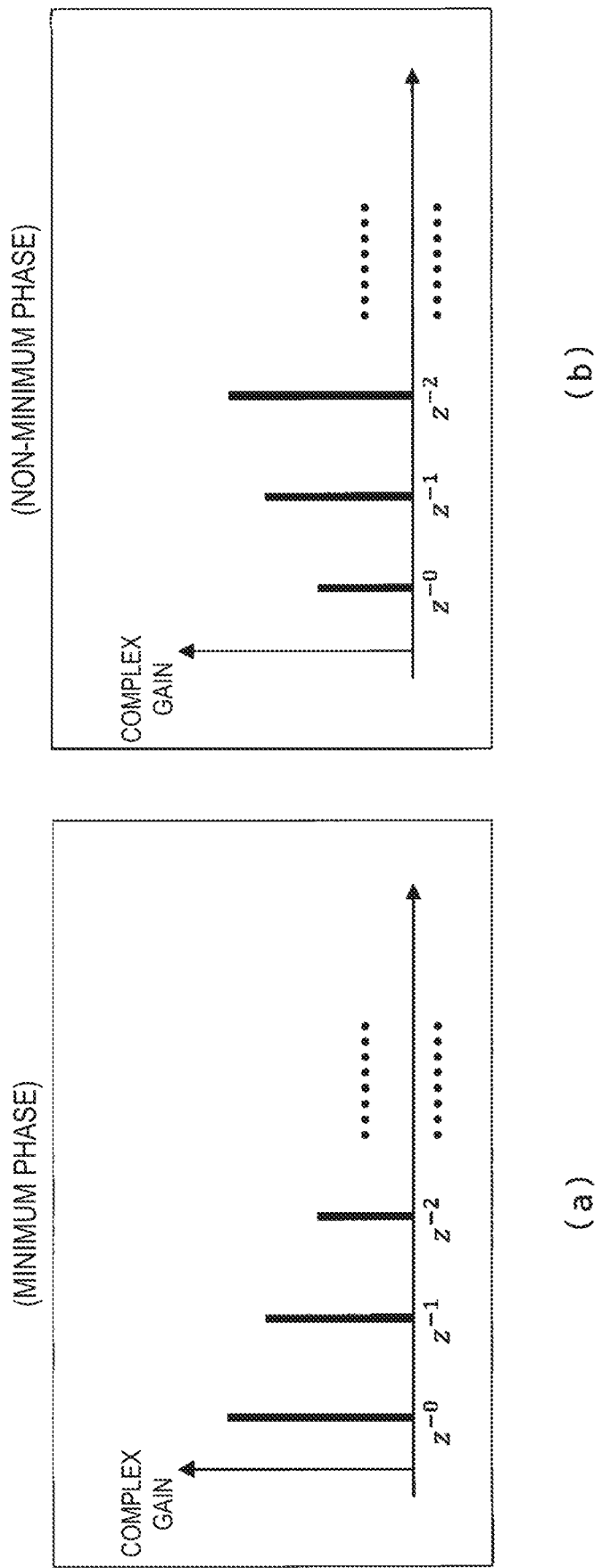
FIG. 6 shows an example of filter tap coefficients when det(Hz) is in a minimum phase versus in a non-minimum phase.

FIG. 5 shows an example of processing performed by the wireless communication system 100 according to the first embodiment or the wireless communication system 100a according to the second embodiment. The process shown in FIG. 5 is executed by the components of the transmitting station device 101 and the receiving station device 102 shown in FIG. 3 or the transmitting station device 101a and the receiving station device 102a shown in FIG. 4.

In step S101, the CIR estimation unit 406 (or the CIR estimation unit 510) receives a training signal transmitted from the receiving station device 102a (or the transmitting station device 101a) and estimates the CIR(H(z)). Here, the transfer function matrix H(z) of the CIR is a matrix having the number of multiple antennas N×N as its elements.

In step S102, the transmission mode determination unit 407 (or the transmission mode determination unit 511) sets an initial value to M=N, with a variable M being the number of antennas ATt of the transmitting station device 101 (or the transmitting station device 101a) and the number of antennas ATr of the receiving station device 102 (or the receiving station device 102a), respectively.

In step S103, the transmission mode determination unit 407 (or the transmission mode determination unit 511) generates a transfer function matrix H˜(z) of all the combinations that are possible from the M transmit antennas and M receive antennas, and computes a determinant det(H˜(z)). Here, H˜(z) is a matrix having elements of M×M corresponding to the multiplex factor of antennas.

In step S104, the transmission mode determination unit 407 (or the transmission mode determination unit 511) determines whether the respective det(H˜(z)) corresponding to all the combinations of M×M antennas are in the minimum phase. Then, if there is a combination with which det(H˜(z)) is in the minimum phase, the flow proceeds to processing in step S106. When there is no combination with which det(H˜(z)) is in the minimum phase, the flow proceeds to processing in step S105.

In step S105, the transmission mode determination unit 407 (or the transmission mode determination unit 511) decreases the number of antennas by one and sets it in M=M−1, and returns to step S103 to repeat processing in a similar manner.

In step 3106, the transmission mode determination unit 407 (or the transmission mode determination unit 511) selects the multiplex factor M of antennas and antenna combination with which det(H˜(z)) is in the minimum phase. Respective blocks of the transmitting station device 101 and the receiving station device 102 (or the transmitting station device 101a and receiving station device 102a) are configured to process signals for M streams so that the number of signal streams will also be the same as the multiplex factor M of antennas.

In step S107, M×M MIMO transmission is carried out via antennas with the multiplex factor of antennas and the combination that were set in step S106.

In this manner, the wireless communication system 100 according to the first embodiment or the wireless communication system 100a according to the second embodiment selects a multiplex factor of antennas and an antenna combination with which the determinant of the transfer function matrix is in the minimum phase and performs communication. Thus, they can remove inter-symbol interference and inter-stream interference with a time-domain linear equalizer without causing divergence of the transmit weight matrix.

As has been described in the respective embodiments, the wireless communication system, wireless communication method, transmitting station device and the receiving station device according to the present invention can remove inter-symbol interference and inter-stream interference with a time-domain linear equalizer by changing the transmission mode so that the determinant of the transfer function matrix for the CIR will not be in a non-minimum phase in SC-MIMO transmission.

REFERENCE SIGNS LIST 100, 100a wireless communication system
101, 101a transmitting station device
102, 102a receiving station device
201 QAM modulation unit
202 linear equalization unit
203, 301 RF unit
302 QAM demodulation unit
401 information bit generation unit
402 data signal modulation unit
403 FIR filter unit
404, 505 transmit signal conversion unit
405, 501 received-signal conversion unit
ATt, ATr antenna
406, 510 CIR estimation unit
407, 511 transmission mode determination unit
408, 512 filter tap calculation unit
410, 504 training signal generation unit
502 data signal demodulation unit
503 information bit detection unit

The invention claimed is:

1. A wireless communication system comprising a transmitting station device and a receiving station device that performs single carrier MIMO transmission between the transmitting station device and the receiving station device,
wherein the transmitting station device comprising:
a time-domain linear equalization unit configured to remove inter-symbol interference and inter-stream interference from a data signal to be transmitted to the receiving station device;
a propagation path characteristics estimation unit configured to receive a training signal which is transmitted by the receiving station device and estimate a transfer function matrix of propagation path characteristics;
a filter tap calculation unit configured to calculate filter tap coefficients for the time-domain linear equalization unit based on the transfer function matrix by a predefined approach; and
a transmission mode determination unit configured to make the filter tap calculation unit calculate the filter tap coefficients when the transfer function matrix meets a predefined condition, and to change a transmission mode and determine the transmission mode that meets the predefined condition when the transfer function matrix does not meet the predefined condition, and
wherein the receiving station device comprising:
a training signal generation unit configured to generate the training signal for use in estimation of propagation path characteristics and transmit the training signal to the transmitting station device.

2. A wireless communication system comprising a transmitting station device and a receiving station device that performs single carrier MIMO transmission between the transmitting station device and the receiving station device,
the transmitting station device comprising:
a time-domain linear equalization unit configured to remove inter-symbol interference and inter-stream interference from a data signal to be transmitted to the receiving station device;
a training signal generation unit configured to generate a training signal for use in estimation of propagation path characteristics and transmit the training signal to the receiving station device, and
the receiving station device comprising:
a propagation path characteristics estimation unit configured to receive the training signal which is transmitted by the transmitting station device and estimate a transfer function matrix of propagation path characteristics;
a filter tap calculation unit configured to calculate filter tap coefficients for the time-domain linear equalization unit of the transmitting station device based on the transfer function matrix by a predefined approach; and
a transmission mode determination unit configured to make the filter tap calculation unit calculate the filter tap coefficients when the transfer function matrix meets a predefined condition, and to change a transmission mode and determine the transmission mode that meets the predefined condition when the transfer function matrix does not meet the predefined condition.

3. The wireless communication system according to claim 1, wherein
the predefined approach is an approach that determines a transmit weight matrix $W(z)$ with a product of $1/\det(H(z))$ and $\text{adj}(H(z))$ using a determinant $\det(H(z))$ of a transfer function matrix $H(z)$ for channel impulse response (CIR) and an adjugate matrix $\text{adj}(H(z))$,
the predefined condition is whether the determinant $\det(H(z))$ of the transfer function matrix $H(z)$ is in a minimum phase or not, and
changing of the transmission mode is changing of antenna combination including a multiplex factor of antennas of the transmitting station device and the receiving station device.

4. A wireless communication method comprising: performing single carrier MIMO transmission between a transmitting station device and a receiving station device, in a wireless communication system, the transmitting station performing:
time-domain linear equalization processing for removing inter-symbol interference and inter-stream interference from a data signal to be transmitted to the receiving station device;
propagation path characteristics estimation processing for receiving a training signal which is transmitted by the receiving station device and estimating a transfer function matrix of propagation path characteristics;
filter tap calculation processing for calculating filter tap coefficients for the time-domain linear equalization processing based on the transfer function matrix by a predefined approach; and
transmission mode determination processing for calculating the filter tap coefficients by the filter tap calculation processing when the transfer function matrix meets a predefined condition, and for changing a transmission mode and determining the transmission mode that meets the predefined condition when the transfer function matrix does not meet the predefined condition, and
the receiving station device performing:
training signal generation processing for generating the training signal for use in estimation of propagation path characteristics and transmitting the training signal to the transmitting station device.

5. The wireless communication method according to claim 4, wherein the predefined approach is an approach that determines a transmit weight matrix W(z) with a product of 1/det(H(z)) and adj(H(z)) using a determinant det(H(z)) of a transfer function matrix H(z) for channel impulse response (CIR) and an adjugate matrix adj(H(z)), the predefined condition is whether the determinant det(H(z)) of the transfer function matrix H(z) is in a minimum phase or not, and changing of the transmission mode is changing of antenna combination including a multiplex factor of antennas of the transmitting station device and the receiving station device.

\* \* \* \* \*